US006170322B1

(12) United States Patent
Yamazaki et al.

(10) Patent No.: US 6,170,322 B1
(45) Date of Patent: Jan. 9, 2001

(54) STROKE IDENTIFYING UNIT OF A FOUR-STROKE ENGINE

(75) Inventors: Ryutaro Yamazaki; Nobuhiko Ito; Yasuo Iwata, all of Saitama (JP)

(73) Assignee: Honda Giken Kogyo Kabushiki Kaisha, Tokyo (JP)

( * ) Notice: Under 35 U.S.C. 154(b), the term of this patent shall be extended for 0 days.

(21) Appl. No.: 09/023,705

(22) Filed: Feb. 13, 1998

(30) Foreign Application Priority Data

Feb. 13, 1997 (JP) ........................................ 9-029255

(51) Int. Cl.[7] ........................................ G01M 15/00
(52) U.S. Cl. ........................................ 73/117.3
(58) Field of Search ........................................ 73/117.3, 117.2, 73/116

(56) References Cited

U.S. PATENT DOCUMENTS 4,889,094 * 12/1989 Beyer et al. .................... 123/414
4,924,863 * 5/1990 Abe .................... 73/117.3
5,321,979 * 6/1994 McKendry et al. .................... 73/117.3
5,402,675 * 4/1995 Entenmann et al. .................... 73/117.3
5,433,108 * 7/1995 Sawada .................... 73/117.3
5,554,802 * 9/1996 Fukui et al. .................... 73/117.3
5,715,780 * 2/1998 Haller .................... 73/117.3

* cited by examiner

*Primary Examiner*—Eric S. McCall
(74) *Attorney, Agent, or Firm*—Birch, Stewart, Kolasch & Birch, LLP

(57) ABSTRACT

A stroke identifying unit, for an electronic fuel injection control system of an engine, can identify cylinder strokes without detection of the rotation of the engine's camshaft. The stroke identifying unit includes a crank pulse generator for detecting a phase of a crankshaft of the engine. In a four cylinder engine, an intake pressure sensor detects the combined intake pressures in the second to fourth intake pipes, communicating with the second to fourth cylinders. A fuel injection control unit identifies strokes of the first to fourth cylinders on the basis of a relationship between the detected phase of the crankshaft and the detected intake pressures.

8 Claims, 5 Drawing Sheets

STROKE IDENTIFYING UNIT OF A FOUR-STROKE ENGINE

BACKGROUND OF THE INVENTION

1. Field of the Invention

The present invention relates to a stroke identifying unit. The stroke identifying unit is capable of working in conjunction with an electronic fuel injection controller of a four-stroke engine.

2. Description of the Relevant Art

In the background art, an electronic fuel injection controller for a four-stroke engine works in conjunction with a stroke identifier in order to properly time fuel injections for individual cylinders of the engine. The stroke identifier, of the background art, identifies the strokes of the individual cylinders on the basis of a relationship between a phase of a crankshaft, detected by a crank sensor, and a phase of a camshaft, detected by a cam sensor.

In order to detect the phase of the camshaft, the cam sensor has to be disposed in a cylinder head of the engine. The cylinder head has to be enlarged in order to accommodate the cam sensor. The cost of the cam sensor and the enlargement of the cylinder head increase the overall cost of the engine. Moreover, when the engine is used to power a motorcycle, the enlarged cylinder head is undesirable, since the engine of a motorcycle is subject to a height limitation.

SUMMARY OF THE INVENTION

In a four-stroke engine, each cylinder undergoes four strokes, i.e., suction, compression, combustion and exhaust strokes, for every two rotations of the crankshaft. Therefore, simply detecting the phase of the crankshaft does not provide enough information to distinguish the suction stroke from the combustion stroke, or the compression stroke from the exhaust stroke.

The present invention utilizes the fact that pressures in intake pipes communicating with intake ports for each engine cylinder vary cyclically during every two rotations of the crankshaft. The present invention uses this fact to distinguish the intake stroke from the combustion stroke, and the compression stroke from the exhaust stroke, for the individual cylinders. When the cyclically varying pressures are analyzed, in conjunction with the phase of the crankshaft, the strokes of the individual cylinders can be accurately detected.

Accordingly, the present invention provides a stroke identifying unit, which can identify cylinder strokes, without detecting a phase of a camshaft.

Therefore, it is a primary object of the present invention to provide a stroke identifying unit which does not require enlargement of the cylinder head of the engine.

Further, it is an object of the present invention to invention to provide a stroke identifying unit which does not require the cost of a cam sensor.

These and other objects are fulfilled by providing a stroke identifying unit of a four-stroke engine comprising: a phase detector for detecting a phase of a crankshaft of the engine; a first intake pressure sensor for detecting an intake air pressure in a first intake pipe communicating with a first cylinder of the engine; and a stroke identifier for distinguishing strokes of the first cylinder based upon a relationship between the detected phase of the crankshaft and the detected intake pressure in the first intake pipe.

Further, these and other objects are fulfilled by providing a fuel injected engine comprising: an engine block; a crankshaft disposed in said engine block; an encoder attached to said crankshaft; a reader proximate said crankshaft for detecting said encoder and for generating a position signal in response to detecting said encoder; a plurality of cylinders in said engine block; a plurality of intake paths, each communicating with a respective one of said plurality of cylinders; a plurality of pressure sensors, each communicating with a respective one of said plurality of intake paths, and each generating a pressure signal representative of a pressure with the respective cylinder; a plurality of fuel injectors, each communicating with a respective one of said plurality of intake paths; and a control unit for receiving said position signal and said pressure signals, and for controlling an injection timing of said plurality of fuel injectors.

Moreover, these and other objects are fulfilled by providing a method of distinguishing a stroke of a cylinder of an engine comprising: providing a phase detector; providing a first intake pressure sensor; providing a stroke identifier; detecting a phase of a crankshaft of the engine; detecting an intake air pressure in a first intake pipe communicating with a first cylinder of the engine; and distinguishing strokes of the first cylinder based upon a relationship between the detected phase of the crankshaft and the detected intake pressure in the first intake pipe.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Figure 1:
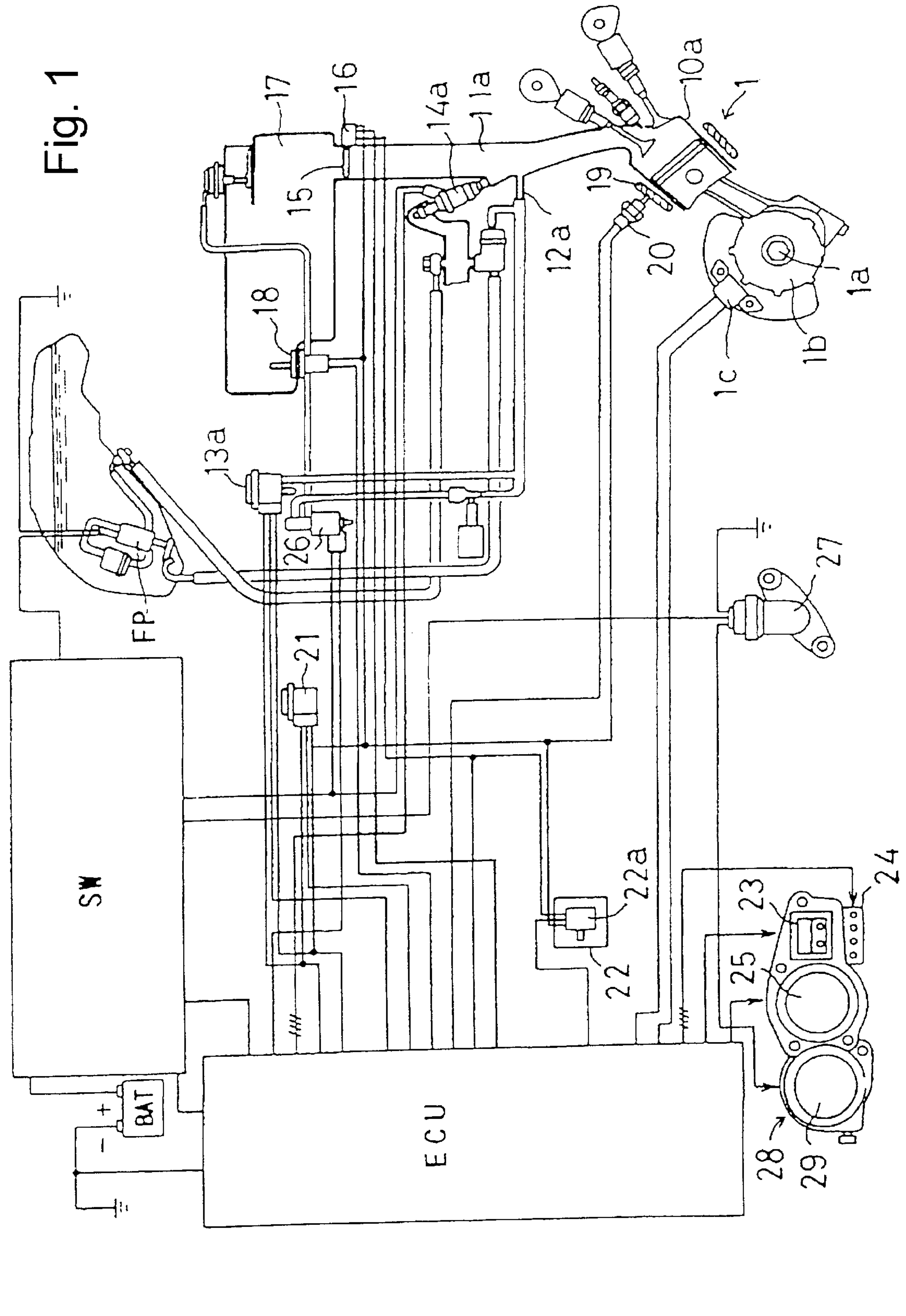
FIG. 1 is a schematic diagram illustrating the stroke identifying unit, according to the present invention, in combination with a four stroke engine.

FIG. 1 illustrates a four-stroke engine 1. The engine 1 includes an electronic fuel injection system. The control system for the electronic fuel injection system includes a crank pulse rotor 1*b* coupled to a crankshaft 1*a*. A crank pulse generator 1*c* is located adjacent to the crank purser rotor 1*b*. As the crankshaft 1*a* turns the crank pulse rotor 1*b*, the crank pulse generator 1*c* produces crank rotating pulse signals.

Figure 2:
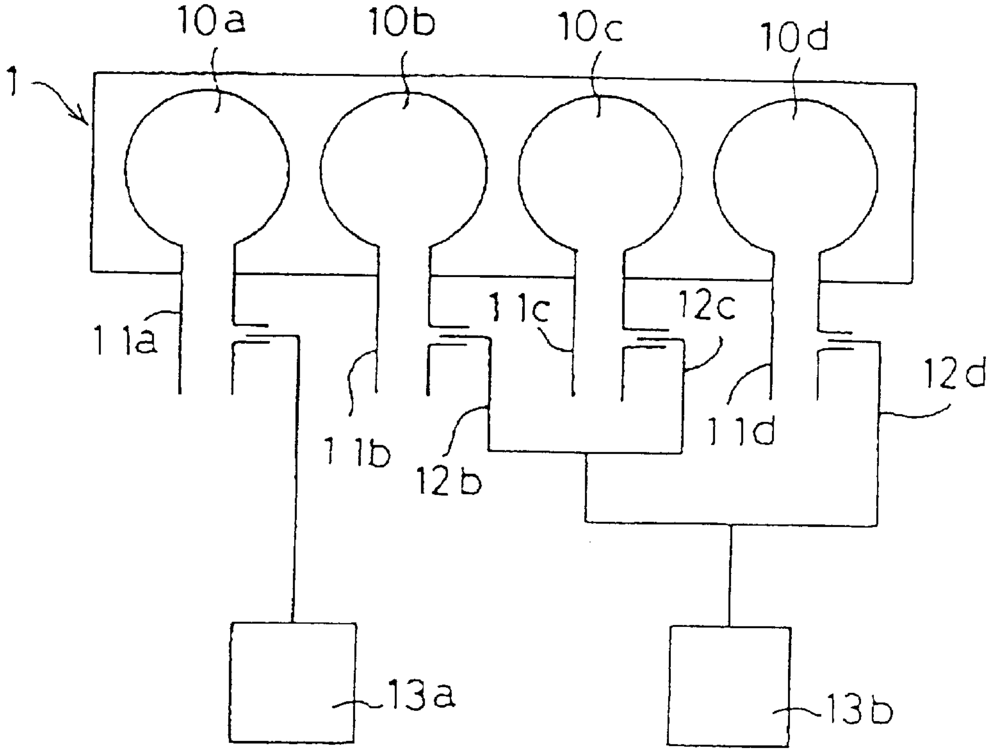
FIG. 2 is a block diagram illustrating pressure tube connections between intake pipes 11*a*, 11*b*, 11*c* and 11*d*, of a four cylinder engine, and an intake pressure sensor.

As shown in FIG. 2, first to fourth intake pipes 11*a* to 11*d* communicate with intake ports of cylinders 10*a* to 10*d*. Fine tubes 12*a* to 12*d*, each have an end connected to a respective one of intake pipes 11*a* to 11*d*. A first intake pressure sensor 13*a* is connected to another end of the first fine tube 12*a* in order to detect an intake pressure P1 in the first intake pipe 11*a*. The other ends of fine tubes 12*b* to 12*d* converge, and are connected to a second intake pressure sensor 13*b* in order to detect a combined pressure Ps (i.e. P2+P3+P4) in the intake pipes 11*b* to 11*d*.

The intake pipes 11*a*–11*d* communicate with fuel injectors (one fuel injector 14*a* being illustrated in FIG. 1). The fuel injectors are connected with, and are controlled by, an electronic fuel injection control unit (hereinafter called the ECU). The ECU includes not only the crank purser generator 1*c*, and the first and second intake pressure sensors 13*a* and 13*b*, but also various other sensors.

A throttle valve opening sensor 16 is connected to a shaft used to open a throttle valve 15 which is upstream of a converging position of the intake pipes 11*a* to 11*d*. An intake temperature sensor 18 is disposed in an air cleaner further upstream of the foregoing converging position. A water temperature sensor 20 is disposed in a cooling water path 19 for cooling the cylinders 10*a* to 10*d*. An atmospheric pressure sensor 21 is disposed at a predetermined position on the motorcycle.

The ECU calculates basic amounts of fuel to be injected by the injectors on the basis of the intake pressure Ps detected by the second intake pressure sensor 13*b*. The ECU also corrects the calculated basic amounts of fuel on the basis of signals from the throttle valve opening sensor 16, intake temperature sensor 18, water temperature sensor 20, and atmospheric pressure sensor 21, thereby determining the fuel injection amounts which are suitable for the operating condition of the engine.

The ECU is influenced by an idle mixture adjuster 22. The idle adjuster 22 controls the amounts of fuel injected by the injectors during idling. The idle adjuster 22 may be constructed as variable resistors (one variable resistor 22*a* being illustrated in FIG. 1). Each of the variable resistors would correspond to a respective one of the cylinders 10*a* to 10*d*. Each of the variable resistors would be capable of setting a voltage signal level corresponding to the amount of fuel to be supplied to its respective cylinder during idling of the engine.

The ECU may also control other equipment besides the fuel injectors. For instance, The ECU can supply temperature readings to a thermometer 23 disposed on a display panel 28 for viewing by an operator of the engine 1. The temperature readings can be based upon the signals received by the ECU from the water temperature sensor 20. In addition, the ECU may activate a warning indicator 24 on the display panel 28 should the temperature exceed a predetermined threshold. Also, the ECU can produce tachometer activating signals on the basis of an engine speed calculated according to the crank pulse signals. The tachometer activating signals can be used to drive a tachometer 25, also disposed on the display panel 28.

In FIG. 1, BAT denotes a power supply battery, and SW denotes a switch unit of the power supply battery for turning on and off the ECU. The engine 1 also includes a fuel pump FP, an intake valve sensor 26, and a speed sensor 27. A speedometer 29, of the display panel 28, is activated in response to a signal from the speed sensor 27.

The cylinders 10*a* to 10*d* are substantially identical in their structure and configuration. Therefore, the operation of the cylinders 10*a* to 10*d* will be described with reference to the first cylinder 10*a* shown in FIG. 1.

In order to control the fuel injection, it is necessary to determine timings for starting fuel injection as well as the amount of fuel to be injected. The present invention utilizes the fact the intake pressure cyclically varies every two rotations (i.e., 720°) of the crankshaft 1*a*. The second intake pressure sensor 13*b* detects the combined pressure Ps of the intake pipes 11*b* to 1*d*. The strokes of the cylinders 10*a* to 10*d* are identified on the basis of variations of the combined intake pressure Ps and the phase of the crankshaft 1*a*, so that the fuel injection timings of the injectors 14*a* to 14*d* are determined for all of the cylinders 10*a* to 10*d*.

Figure 4:
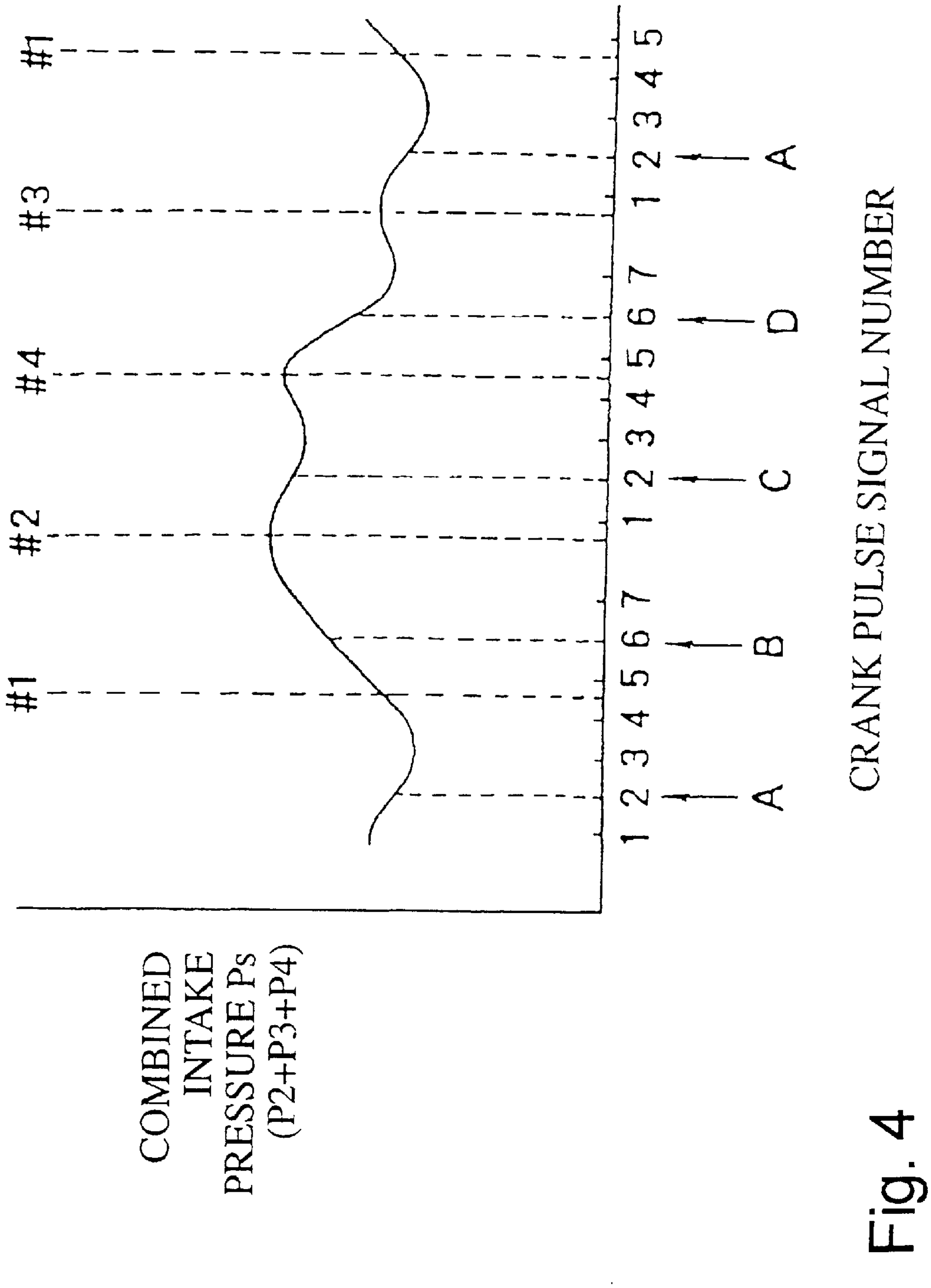
FIG. 4 is a graph illustrating a variation of the combined intake pressure of intake pipes 11*b*, 11*c* and 11*d*.

FIGS. 3(A) to (D) are graphs showing variations of the intake pressures P1, P2, P3 and P4 in the first to fourth intake pipes 11*a* to 11*d*. FIG. 4 shows variations of the combined intake pressure Ps in the second to fourth intake pipes 11*b* to 11*d*. In these graphs, the ordinate represents the intake air pressures while the abscissa represents periods of crank pulse signals (hereinafter called pulse signals). The pulse signals are produced by the crank pulse generator 1*c*. Numerals 1–7 on the abscissa are assigned to the pulse signals, which are produced during each rotation of the crankshaft 1*a*. Further, #1 to #4 represent timings at which pistons of the first to fourth cylinders 10*a* to 10*d* reach top dead center.

For instance, the first piston of the first cylinder 10*a* reaches top dead center at the timing #1, immediately after the first pulse signals is output. When taking the first cylinder as a starting point, the pistons in the cylinders 10*a* to 10*d* sequentially reach top dead center at the timings #1, #2, #4 and #3, respectively.

Figure 5:
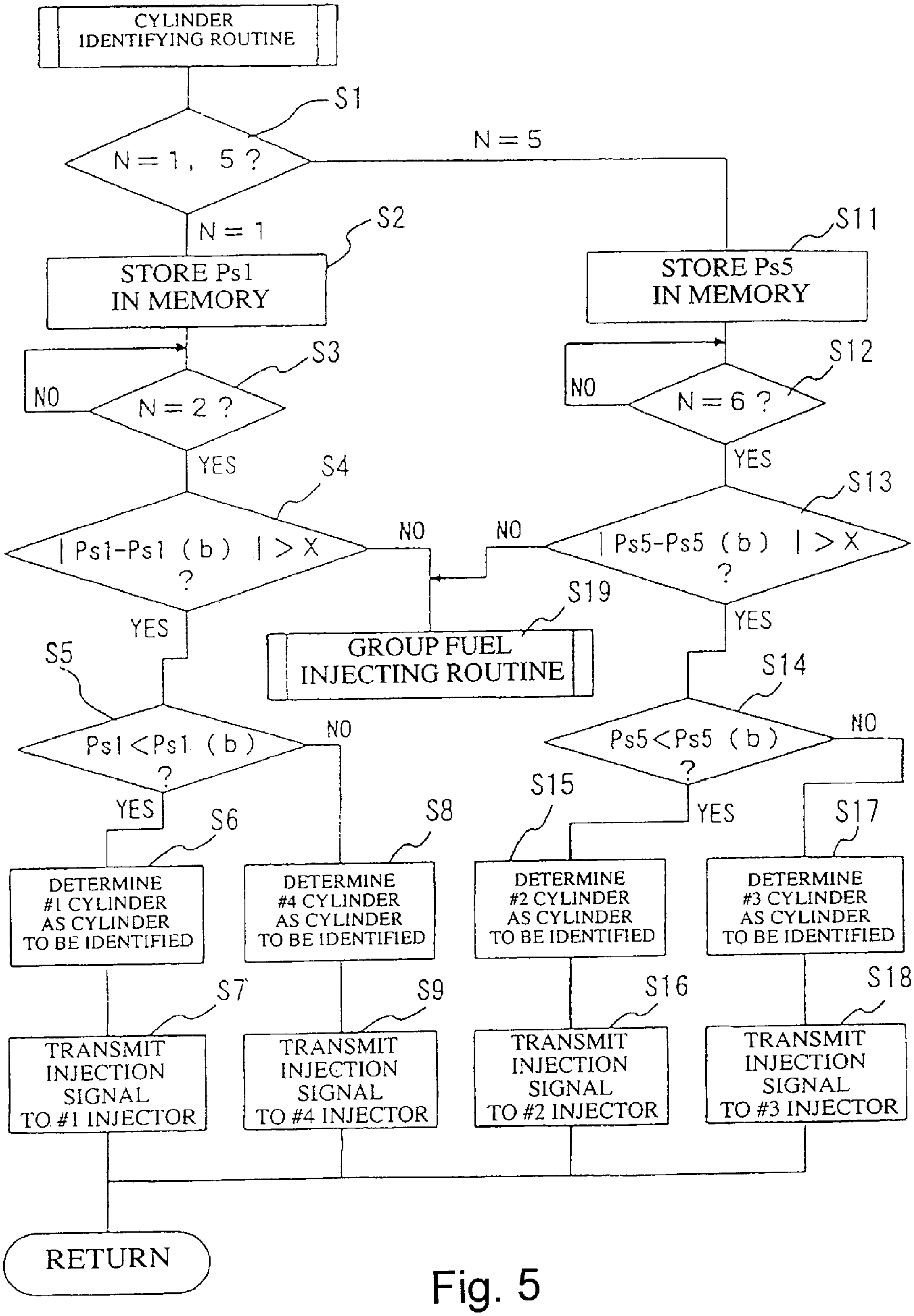
FIG. 5 is a flowchart illustrating a method of operation for the stroke identifying unit.

The ECU identifies the strokes of the respective cylinders using a procedure illustrated by the flowchart of FIG. 5. In step S1, the ECU monitors the pulse signals until either the first or fifth pulse signal is sent from the crank pulse generator 1*c*. If the first pulse signal is detected, step S2 occurs, the ECU reads the combined intake pressure signal from the second intake air pressure sensor 13*b*. The read combined intake pressure is defined to be Ps1 and stored in memory.

Next, in step S3, the ECU monitors the pulse signals until the second pulse signal is detected. Once the second pulse signal is detected, step S4 occurs. In step S4, the ECU derives an absolute value of a difference between the combined intake pressure signal Ps1 (detected with the first pulse signal in the current cycle) and a combined intake pressure signal Ps1(*b*) (detected together with the first pulse signal in a previous cycle).

If the absolute value is above a predetermined value X, the combined intake pressure signals Ps1 and Ps1(*b*) are compared in step S5. If the combined intake signal Ps1 is smaller than Ps1(*b*), step S6 occurs. In step S6, the ECU determines that the piston in the first cylinder 10*a* should reach top dead center earliest which distinguishes the stroke of the first cylinder (i.e., in a state indicated by "A" in FIG. 4). Thereafter, the ECU counts the predetermined number of pulse signals, and, as set forth in step S7, sends the fuel injection signal to the injector 14*a* for the first cylinder 10*a*. Thereby, the first injector 14*a* will inject the predetermined amount of fuel at the proper time.

If in step S5, the intake pressure signal Ps1 is larger than Ps1(*b*), step S8 occurs. In step S8, the ECU determines that the piston in the fourth cylinder 10*d* should reach top dead center earliest (i.e., in a state indicated by "C" in FIG. 4). Thereafter, the ECU counts the predetermined number of pulse signals, and, as set forth in step S9, sends the fuel injection signal to the fourth injector for the fourth cylinder 10*d*. Thereby, the fourth injector will inject the predetermined amount of fuel at the proper time.

When the fifth pulse is detected in step S1, the ECU functions in a manner similar to that described above. In step S11, the ECU stores a combined intake air pressure signal as a signal Ps5 in the memory. Next, in step S12, the ECU monitors the pulse signals until the sixth pulse signal is detected. In step S13, the ECU derives an absolute value of a difference between the combined intake pressure signal Ps5 and a combined intake air pressure signal Ps5(*b*) detected together with the fifth pulse signal in the previous cycle.

When the absolute value is larger than the predetermined value X, step S14 occurs. In step S14, the ECU compares Ps5 and Ps5(*b*). If Ps5 is smaller than Ps5(*b*), step S15 occurs. In step S15, the ECU determines that the piston in the second cylinder 10*b* should reach top dead center earliest (i.e., in a state indicated by "B" in FIG. 4). Thereafter, the ECU counts the predetermined number of pulses signals, and, as set forth in step S16, sends the fuel injection signal to the second injector for the second cylinder 10*b*. Thereby, the second injector will inject the predetermined amount of fuel at the proper time.

If in step S14, Ps5 is larger than Ps5(*b*), step S17 occurs. In step S17, the ECU determines that the piston in the third cylinder 10*c* should reach top dead center earliest (i.e. in a state indicated by "D" in FIG. 4). Thereafter, the ECU counts the predetermined number of pulse signals, and, as set forth in step S18, sends the fuel injection signal to the third injector of the third cylinder 10*c*. Thereby, the third injector will inject the predetermined amount of fuel at the proper time.

If the absolute differences derived in steps S4 and S13 are smaller than the predetermined value X, a group fuel injection routine will be carried out in step S19. In the group fuel injection routine, if it is impossible to identify top dead center in the compression stroke or the exhaust stroke, fuel will always be injected after a predetermined number of pulse signals is counted whenever top dead center is detected.

The fuel injection timings are the same for the cylinders in which the pistons operate in unison with respect to the crankshaft. Therefore, these cylinders are treated as a group, for which one fuel injection timing is determined. In this embodiment, the first and fourth cylinders 10*a* and 10*d* constitute one group, while the second and third cylinders 10*b* and 10*c* constitute another group.

For example, assume that step S19 is performed via step S4. The fuel injection signal is supplied to the first and fourth injectors associated with the first and fourth cylinders 10*a* and 10*d*, after the predetermined number of pulse signals are counted following the detection of the second pulse signal. Thereby, the first and fourth injectors will inject the predetermined amount of fuel.

If step S19 is performed via step S13, the fuel injection signal is supplied to the second and third injectors for the cylinders 10*b* and 10*d*, after the predetermined number of pulse signals is counted following the detection of the sixth pulse signal. Thereby, the second and third injectors will inject the predetermined amount of fuel, noting that the amount of fuel to be injected is appropriately adjusted through calculation.

The predetermined value X may be small, and there is little likelihood of erroneous identification of the strokes, if the variation of the combined intake pressure Ps is relatively small. Conversely, if the combined intake pressure Ps varies extensively, the predetermined value X has to be large. Stroke identification is impossible when the combined intake pressure signal cannot be detected because of noise, or the like, such as if the engine speed is above the predetermined value, or if the throttle valve opens more than the predetermined amount.

In the foregoing embodiment, the fuel injection timings of the injectors are determined on the basis of the fact that the combined intake pressure Ps of the intake pipes 11*b* to 11*d* communicating with the cylinders 10*b* to 10*d* varies cyclically. However, it is possible to determine the fuel injection timings in the following way. The internal pressure of one intake pipe communicating with one cylinder (refer to FIG. 3(A)), or the combined intake pressure of intake pipes communicating with cylinders in different groups (e.g., intake pressure P1 of the first intake pipe and intake pressure P2 of the second intake pipe shown in FIG. 6) varies cyclically while the crankshaft rotates through 720°.

Figure 6:
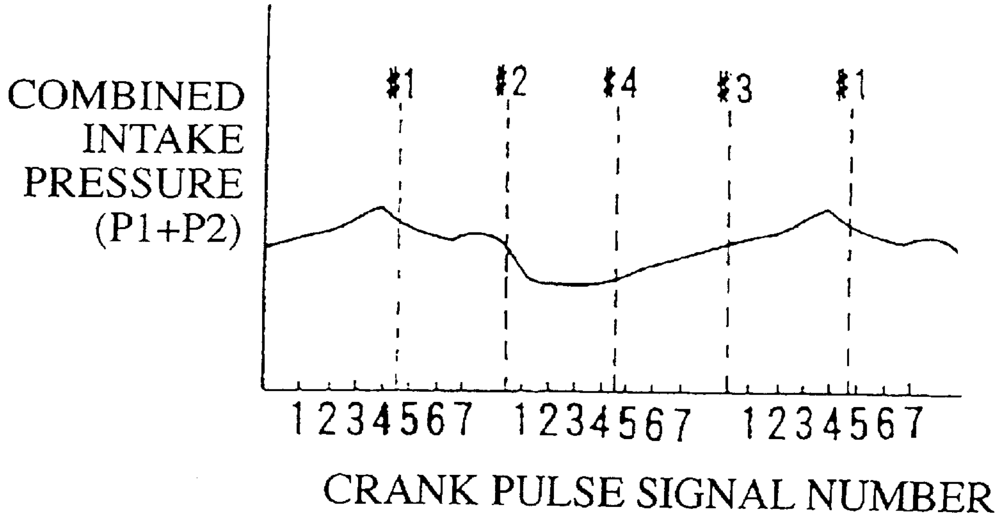
FIG. 6 is a graph illustrating a variation of the combined intake pressure of intake pipes 11*a* and 11*b*.
Figure 3A:
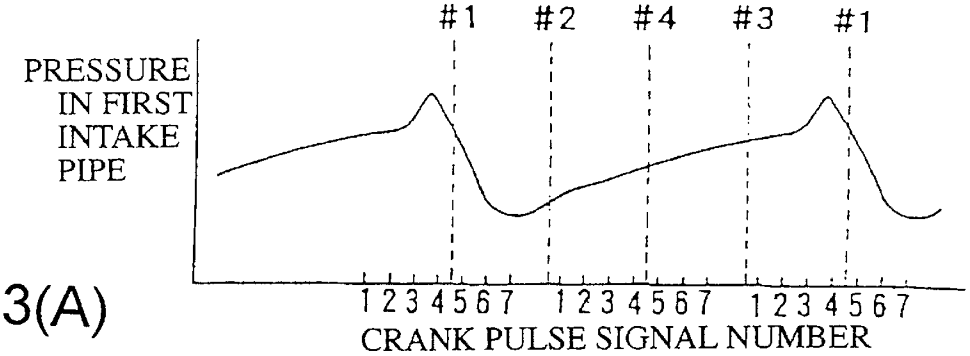
FIGS. 3(A), (B), (C) and (D) are graphs showing variations of intake pressures in the individual intake pipes communicating with the four cylinders.
Figure 3B:
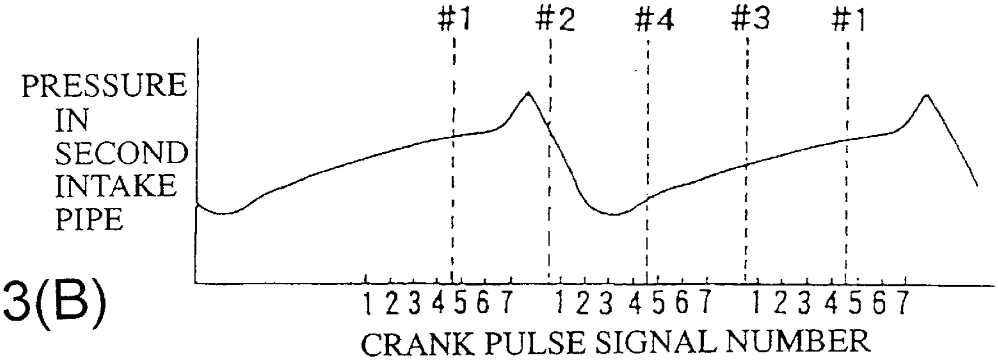
Figure 3C:
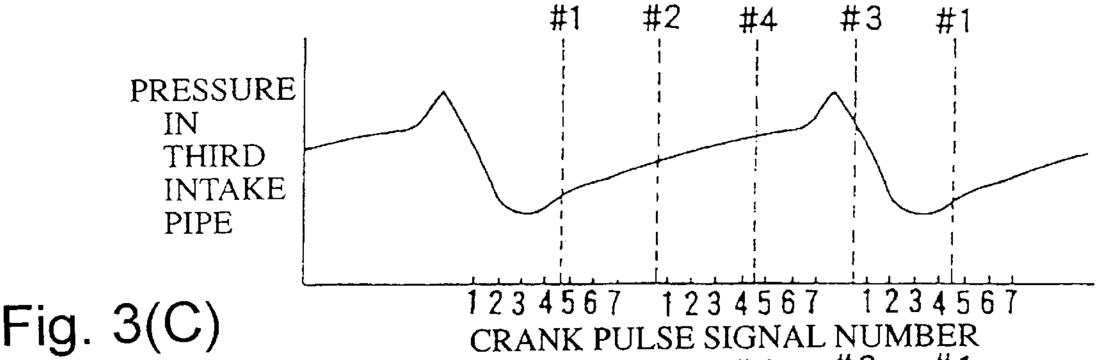
Figure 3D:
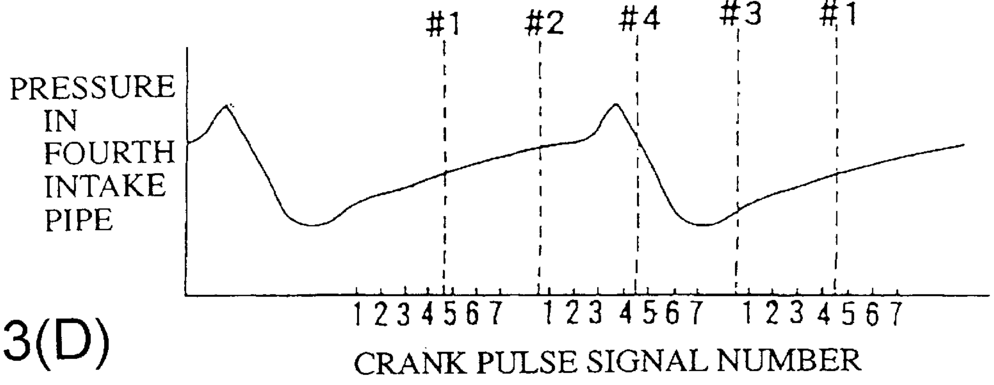

The strokes in the cylinders can be identified based on the foregoing intake pressures in order to determine the fuel injection timings for the injectors. For instance, when the intake pressure P1 of the first intake pipe 14*a* is used, the strokes will be identified by comparing values of intake pressure signals at the time of detecting the third and seventh pulse signals. If the combined intake pressure shown in FIG. 6 is utilized, the strokes will be identified by comparing the intake signal values when the first and fifth pulse signals are detected. Still further, it is possible to control the fuel injection timings using one intake pressure sensor, which has a certain specification, identifies cylinders and can perform map searching.

In the foregoing embodiment, two combined intake pressures in the previous and current cycles, which are close to each other are compared, in order to identify the strokes of the cylinders. Even when the combined intake pressures are somewhat variable, the cylinder strokes can be precisely identified. Conversely, if intake pressures remain stable in the current cycle, the combined intake pressure detected in the previous cycle is used in order to determine the relationship between the cyclic variation of the intake pressures and the phase of the crankshaft, so that the cylinder strokes will be identified.

The stroke identifying unit of the present invention has been described in combination with a four-cylinder engine, however, the present invention is also applicable to engines utilizing more or less cylinders than four. For example, the present invention could be used with a single-cylinder engine and a six-cylinder engine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A stroke identifying unit of a four-stroke engine comprising:

a phase detector for detecting a phase of a crankshaft of the engine;

a first intake pressure sensor for detecting an intake air pressure in a first intake pipe communicating with a first cylinder of the engine;

an intake pressure memory for storing the detected intake air pressure at a predetermined phase of the crankshaft; and a stroke identifier for distinguishing strokes of the first cylinder based upon a comparison between a stored, previously detected intake air pressure at the predetermined phase of the crankshaft and a presently detected intake air pressure at the predetermined phase of the crankshaft.

2. The stroke identifying unit according to claim 1, wherein said phase detector includes an encoder for attachment to the crankshaft, and a reader for attachment to the engine.

3. The stroke identifying unit according to claim 1, further comprising:

a second intake pressure sensor for detecting an intake air pressure in a second intake pipe communicating with a second cylinder of the engine;

wherein said stroke identifier distinguishes strokes of the first and second cylinders, based upon a relationship between a stored, previously detected combined intake air pressure of the first and second intake pipes at the predetermined phase of the crankshaft with a presently detected combined intake air pressure of the first and second intake pipes at the predetermined phase of the crankshaft.

4. The stroke identifying unit according to claim 3, wherein the first and second cylinders are consecutive in a firing order of the engine.

5. The stroke identifying unit according to claim 1, further comprising:

second and third intake pressure sensors for detecting intake air pressures in second and third intake pipes communicating with second and third cylinders of the engine, respectively;

wherein said stroke identifier distinguishes strokes of the first, second, and third cylinders, based upon a relationship between a stored, previously detected combined intake air pressure of the first, second, and third intake pipes at the predetermined phase of the crankshaft with a presently detected combined intake air pressure of the first, second, and third intake pipes at the predetermined phase of the crankshaft.

6. The stroke identifying unit according to claim 5, wherein the first, second, and third cylinders are consecutive in a firing order of the engine.

7. A method of distinguishing a stroke of a cylinder of a four-stroke engine comprising:

providing a phase detector;

providing a first intake pressure sensor;

providing a stroke identifier;

detecting a phase of a crankshaft of the engine;

detecting an intake air pressure in a first intake pipe communicating with a first cylinder of the engine at a predetermined phase of the crankshaft;

storing the intake air pressure in an intake pressure memory; and distinguishing strokes of the first cylinder based upon a comparison between a stored, previously detected intake air pressure at the predetermined phase of the crankshaft and a presently detected intake air pressure at the predetermined phase of the crankshaft.

8. The method according to claim 7, wherein said step of detecting an intake air pressure further includes: detecting an intake air pressure in a second intake pipe communicating with a second cylinder, and wherein said step of distinguishing strokes of the first cylinder includes comparing a stored, previously detected combined intake air pressure of the first and second intake pipes at the predetermined phase of the crankshaft with a presently detected combined intake air pressure of the first and second intake pipes at the predetermined phase of the crankshaft.

* * * * *